(12) United States Patent
Schimpf

(10) Patent No.: US 6,410,852 B1
(45) Date of Patent: Jun. 25, 2002

(54) CONTINUOUSLY-THREADED PVC ELECTRICAL CONDUIT

(76) Inventor: Ronald Eugene Schimpf, 5482 W. Marietta Rall Road St., Shelbyville, IN (US) 46176

( * ) Notice: Subject to any disclaimer, the term of this patent is extended or adjusted under 35 U.S.C. 154(b) by 25 days.

(21) Appl. No.: 09/592,198

(22) Filed: Jun. 12, 2000

(51) Int. Cl.[7] .................................................. H02G 3/04
(52) U.S. Cl. ...................... 174/68.3; 174/70 C; 174/48; 138/121; 138/173
(58) Field of Search .............................. 174/68.3, 70 C, 174/72 A, 72 C, 102 R, 105 R, 109, 110 R, 135, 48; 138/118, 121, 122, 129, 173

(56) References Cited

U.S. PATENT DOCUMENTS 4,678,867 A  *  7/1987  Bongard et al. .......... 1747/135
5,654,525 A  *  8/1997  Starozik ...................... 174/49
5,763,832 A  *  6/1998  Anselm ..................... 174/65 R

* cited by examiner

Primary Examiner—Dean A. Reichard
Assistant Examiner—W. David Walkenhorst
(74) Attorney, Agent, or Firm—Woodard, Emhardt, Naughton, Moriarty & McNett

(57) ABSTRACT

A conduit to house electrical wires is provided between two electrical service boxes. The conduit includes a length of continuously-threaded Schedule 80 PVC tubing which has a first end and a second end. The tubing is externally threaded from the first end to the second end. The conduit further includes a first lock nut and a first threaded bushing cooperatively threaded onto the conduit to secure the conduit to one of the electrical service boxes. The conduit can further include a second lock nut and a second threaded bushing cooperatively threaded on the conduit to secure the conduit to the other electrical service box. Alternatively, the tubing can include a collar to secure the conduit to the other electrical service box.

13 Claims, 4 Drawing Sheets

CONTINUOUSLY-THREADED PVC ELECTRICAL CONDUIT

FIELD OF THE INVENTION

The present invention relates generally to electrical conduit, and more particularly to an electrical conduit that can easily be cut to size on a job site.

BACKGROUND OF THE INVENTION

Electrical conduit (chase) acts as passageway for electrical wires which connect one electrical service box to another. For example, in a residential use the conduit may run from the back of an electrical meter box through a wall of a house and into a circuit breaker or fuse box in the house. The electrical wires run through the conduit from the electric meter to the circuit breaker box.

Electrical conduit is generally made of tubing which is threaded at both ends so that threaded fittings can be threaded onto the ends to secure the electrical service boxes. One type of conduit is threaded only at its ends and is unthreaded between the threaded ends. This may create a problem during installation, because if the distance between the electrical service boxes does not correspond to the length of the conduit, the conduit must be cut to the appropriate length and threaded at the cut end so that the fittings can be threaded onto the cut end. However, this solution requires additional labor and equipment. Alternatively, if an electrician is unable or does not wish to cut the tubing to its proper length, the extra length of tubing ends up inside one of the electrical service boxes. The extra length of tubing crowds the electrical wires and makes wiring difficult within the box.

Another type of electrical conduit is a continuously-threaded metal tube which can be cut to any length at a job site in order to coincide with the distance between two electrical service boxes. Although this type of conduit solves the problem of variable distance between electrical service boxes, the metal conduit is expensive and requires additional labor and equipment to install. Moreover, metal tubing, such as steel tubing, is difficult to cut, and the metal is cut, large burrs are formed at the cut end. The metal burrs prevent threading of threaded fittings onto the cut end. Therefore, the cut end must be deburred so that the threaded fittings can be threaded onto the cut end of the metal tubing.

Additionally, metal tubing causes greater wear on electrical wires as compared to other softer materials. Further, most local codes require grounding (bonding) of the metal tubing. In order to ground the conduit, a bushing of the conduit is connected to a grounded portion of the electrical service box. However, if the metal tubing is not properly grounded, a serious electrical hazard can be created. Since metal is a conductor, electrical shorts of the electrical wiring within the metal may not be adequately contained.

A need therefore exists for an electrical conduit that overcomes the deficiencies and problems associated with the conventional technology noted above. The present invention address that need.

SUMMARY OF THE INVENTION

A conduit for electrical wires includes a length of continuously-threaded Schedule 80 PVC tubing having a first end and a second end, with the tubing being externally threaded from the first end to the second end. The conduit includes a lock nut and a threaded bushing cooperatively threaded onto at least the first end of the tubing.

In one aspect of the present invention, the conduit further includes a second lock nut and a second threaded bushing cooperatively threaded onto the second end of the tubing. In another aspect of the present invention, the tubing has a collar provided on the second end of the tubing.

The present invention also provides a method of providing a conduit for electrical wires between two electrical service boxes. In the method, a length of continuously-threaded Schedule 80 PVC tubing with a length that is greater than a distance between the two electrical service boxes is cut to a length which is slightly greater than the distance between the two boxes. The first end of the tubing is coupled to one of the electrical service boxes by positioning the end of the tubing inside the box and threading a threaded bushing onto the tubing to secure the tubing to the box. The second end of the tubing is coupled to the other electrical service box in the same manner.

Alternatively, the method may be accomplished by inserting the first end of the tubing through a hole in the other of the electrical service boxes until a collar provided on the second end of the tubing abuts an area of the other of the electrical service boxes which surrounds the hole.

One object of the present invention is to provide a conduit for electrical wires which can easily be cut to any length at a job site.

Another object of the present invention is to provide a conduit for electrical wires which can be installed without requiring deburring of cut ends of the conduit.

Still yet another object of the present invention is provide a conduit for electrical wires which does not require grounding of the conduit.

Another object of the present invention is to provide a conduit for electrical wires which does not increase wear on the wires.

Yet another object of the present invention is to provide an inexpensive conduit for electrical wires.

Still yet another object of the present invention is to provide a conduit for electrical wires which safely contains electrical overloads.

Another object of the present invention is to provide a method of providing a conduit for electrical wires between to electrical service boxes which is easy.

Further objects, features, advantages, and aspects of the present invention shall become apparent from the detailed drawings and descriptions contained herein.

BRIEF DESCRIPTION OF THE DRAWINGS

The invention will be better understood with respect to the accompanying drawings, in which.

DESCRIPTION OF THE PREFERRED EMBODIMENT

For the purposes of promoting an understanding of the principals of the invention, reference will now be made to the preferred embodiments and specific language will be used to describe the same. It will nevertheless be understood that no limitation of the scope of the invention is thereby intended. Any alterations and further modifications in the described device, and any further applications of the principals of the invention as described herein are contemplated as would normally occur to one skilled in the art to which the invention relates.

Figure 1:
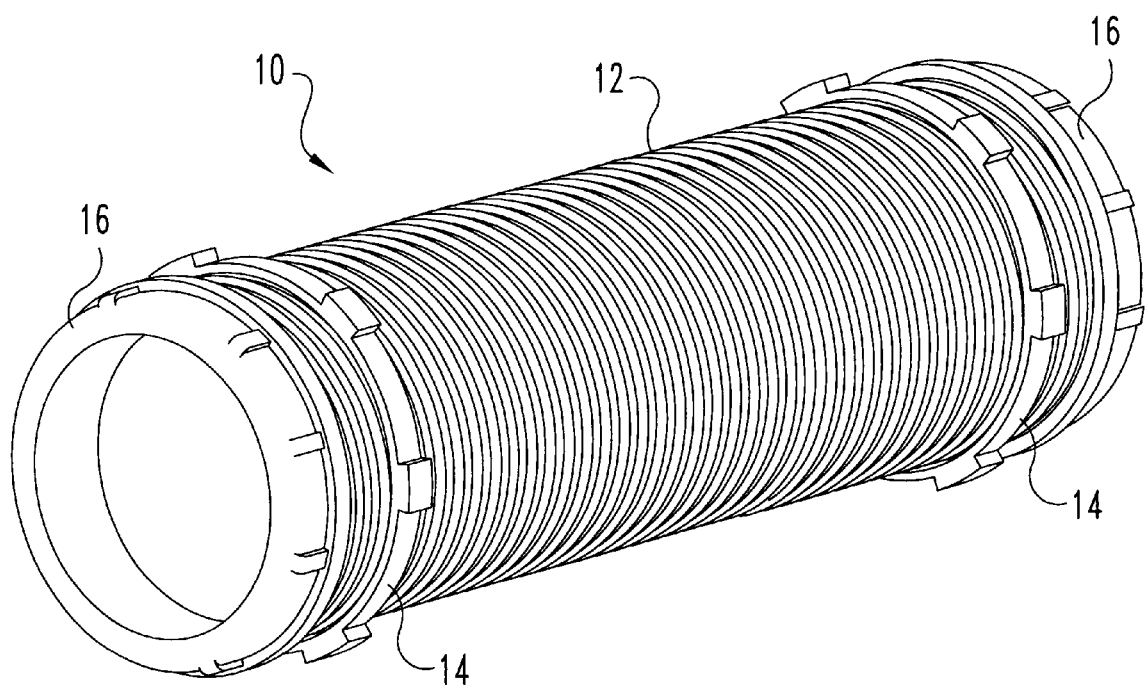
FIG. 1 shows a perspective view of a conduit.

Referring now to FIG. 1, a perspective view of a conduit 10 according to one embodiment of the present invention is shown. The conduit 10 includes a length of Schedule 80 PVC tubing 12. A lock nut 14 and threaded collar or bushing 16 are threaded onto one end of the tubing 12. Another lock nut 14 and threaded collar/bushing 16 are threaded on the other end of the tubing 12. In order to provide a better view of the components in FIG. 1, the lock nuts 14 and the bushings 16 are spaced apart from each other along the tubing 12. Once conduit 10 is installed the respective lock nut 14 and bushing 16 pairs are cooperatively threaded together so that lock nuts 14 secure the bushings 16.

The lock nuts 14 and bushings 16 of the present invention are not limited to the ones shown in the drawings. Other types of fittings which are generally known to those skilled in the art are also contemplated to be included in the present invention. In addition, the lock nuts 14 and bushings 16 can be made from similar or different types of materials such as plastics, metals, and other materials generally known to those skilled in the art. In a preferred form, the lock nut 14 is made of metal, and the bushing 16 is made of plastic.

Figure 2:
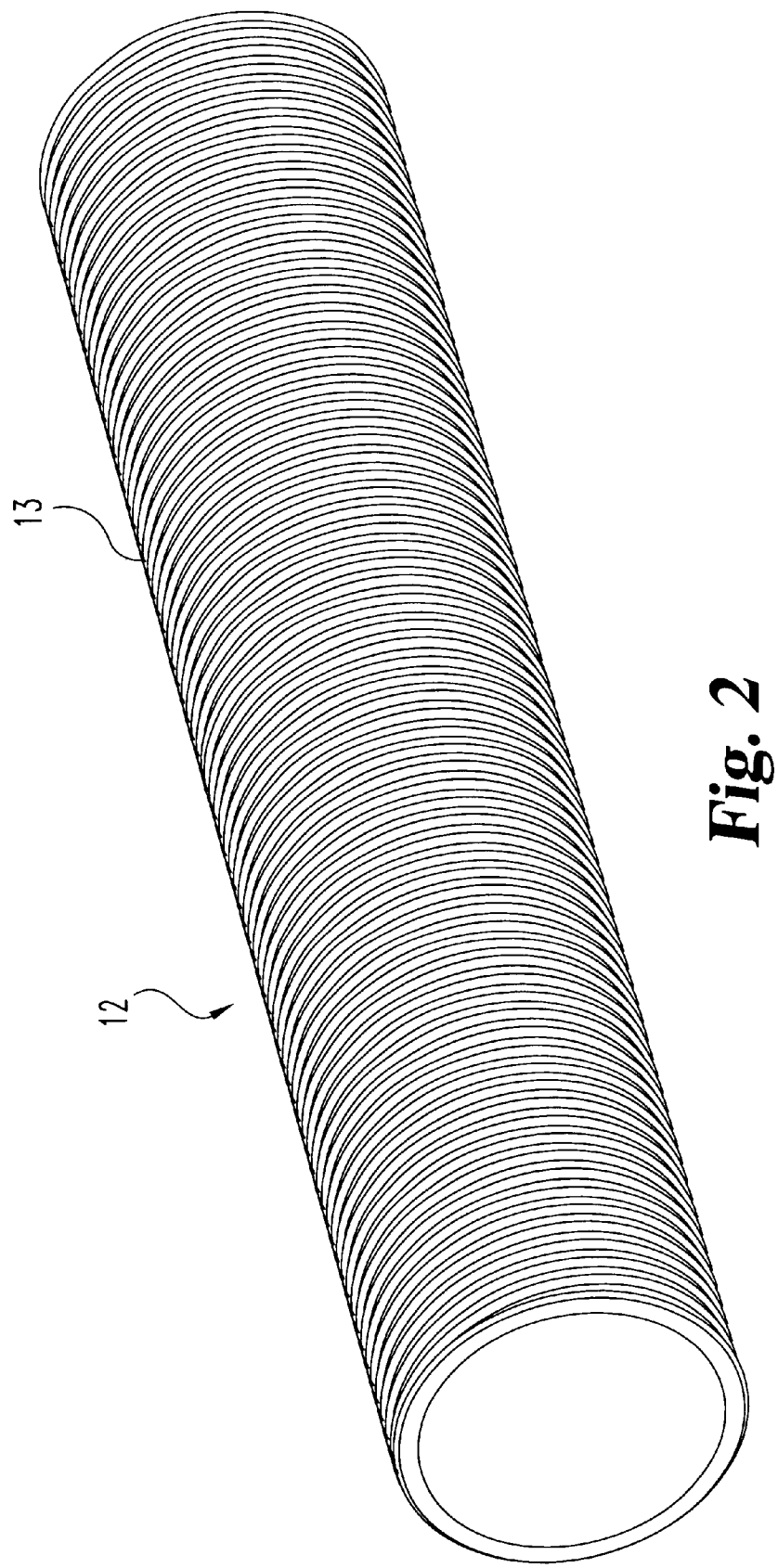
FIG. 2 shows a perspective view of a tubing of the conduit.

As shown in FIG. 2, the Schedule 80 PVC tubing 12 is continuously-threaded on its exterior between both ends of the tubing 12. Since the tubing 12 is continuously-threaded, the tubing 12 can be cut to any length without requiring the tubing 12 to be threaded at a job site (field threaded).

Threads 13 can be formed on the tubing 12 in a factory using a threading machine as generally known to those skilled in the art. Alternatively, the threads 13 can be formed during molding or extrusion of the tubing 12. In a preferred form, the threads 13 are formed on the tubing 12 by threading Schedule 80 PVC tubing on a threading machine.

The present invention also contemplates other methods of forming threads 13 on the tubing 12 as generally known to those skilled in the art. In addition, as generally known to those skilled in the art, the threads 13 could be easily substituted by threads having a different pitch or form than those shown in the drawings. Threads 13 can have a single thread configuration or a multiple thread configuration, and can be right-handed or left-handed threads. Preferably, threads 13 are single right-handed threads.

The tubing 12 is made out of a polyvinyl chloride plastic (PVC). Metal tubing is generally more expensive than a similarly sized PVC tubing. In addition, metal tubing is harder to cut than PVC tubing. Thus, the tubing 12 of the present invention is cheaper and easier to cut at a job site. As discussed above, when metal tubing is cut large burrs form at the cut end. These large metal burrs formed on the cut end interfere with the proper threading of a bushing and a lock nut onto the cut end. Therefore, the cut end of the metal tubing has to be deburred in order to allow the lock nut and the bushing to be successfully threaded onto the cut end. Additional equipment is required to deburr the metal tubing. In contrast, the PVC tubing 12 of the present invention does not form significant burrs when cut. Thus, a cut end of the PVC tubing 12 does not have to be first deburred in order to allow the lock nut 14 and bushing 16 to be cooperatively threaded onto the threads 13 of the cut end of the tubing 12.

Conduit made of metal tubing tends to wear electrical wires more than plastic tubing. Worn electrical wires can create electrical shorts within the conduit which create serious safety problems. Since the plastic PVC tubing 12 of the present invention is an insulator, the PVC tubing 12 of the present invention contains electrical overloads better than highly conductive metal tubing.

In order to make the metal conduit safer, most local electrical codes require grounding of the metal tubing with respect to the electrical service boxes. When multiple electrical service boxes are coupled together with the metal tubing, the metal tubing has to be grounded to the electrical service boxes. In addition, specialized bushings are needed in order to ground conduit formed with metal tubing. Further, if the metal tubing is not properly grounded a serious electrical hazard is created. The PVC tubing 12 of the present invention is an insulator, and does not need to be grounded to be safe and to satisfy most local codes. Thus, labor is reduced in installation of the conduit 10 of the present invention, because additional effort is not required to ground the conduit 10. Material cost savings are realized, because special grounded bushings are not needed for the conduit 10 according to the present invention. Further, safety is improved with the conduit 10 of the present invention.

Additionally, the Schedule 80 PVC tubing has a large enough wall thickness so that threads 13 can be formed in the tubing 12 while providing acceptable rigidity in order to meet most local electrical codes. In a preferred form of manufacturing the conduit 10, the tubing 12 is initially unthreaded and has dimensions according to "Schedule 80" PVC tubing.

Schedule 80 is a set of customary sizes and dimensions of PVC tubing that is widely accepted throughout industry. Likewise, "Schedule 40" PVC tubing is a set of customary sizes and dimensions for PVC tubing which has thinner wall thickness at a given trade size than Schedule 80 tubing. Below are tables showing the dimensions and tolerances of typical Schedule 40 and 80 PVC tubing.

| | SIZES AND DIMENSIONS OF SCHEDULE 40 PVC TUBING U.S. CUSTOMARY UNITS (INCHES) | | | | |
|---|---|---|---|---|---|
| TRADE SIZE | AVERAGE OUTSIDE DIAMETER | MAXIMUM OUTSIDE DIAMETER | MINIMUM OUTSIDE DIAMETER | MINIMUM WALL THICKNESS | MINIMUM INSIDE DIAMETERS |
| ½ | 0.840 ± 0.004 | 0.848 | 0.832 | 0.109 | 0.578 |
| ¾ | 1.050 ± 0.004 | 1.060 | 1.040 | 0.113 | 0.780 |
| 1 | 1.315 ± 0.005 | 1.325 | 1.305 | 0.133 | 1.004 |
| 1¼ | 1.660 ± 0.005 | 1.672 | 1.648 | 0.140 | 1.335 |
| 1½ | 1.900 ± 0.008 | 1.912 | 1.898 | 0.145 | 1.564 |
| 2 | 2.375 ± 0.006 | 2.387 | 2.363 | 0.154 | 2.021 |
| 2½ | 2.875 ± 0.007 | 2.890 | 2.860 | 0.203 | 2.414 |
| 3 | 3.500 ± 0.008 | 3.515 | 3.485 | 0.216 | 3.008 |
| 3½ | 4.000 ± 0.008 | 4.050 | 3.950 | 0.226 | 3.486 |
| 4 | 4.500 ± 0.009 | 4.550 | 4.450 | 0.237 | 4.961 |
| 5 | 5.583 ± 0.010 | 5.613 | 5.513 | 0.258 | 4.975 |
| 6 | 6.625 ± 0.011 | 6.675 | 6.575 | 0.280 | 5.886 |
| 8 | 8.625 ± 0.015 | 8.675 | 8.575 | 0.322 | 7.853 |

SIZES AND DIMENSIONS OF SCHEDULE 80 PVC TUBING
U.S. CUSTOMARY UNITS (INCHES)

| TRADE SIZE | AVERAGE OUTSIDE DIAMETER | MAXIMUM OUTSIDE DIAMETER | MINIMUM OUTSIDE DIAMETER | MINIMUM WALL THICKNESS | MINIMUM INSIDE DIAMETERS |
|---|---|---|---|---|---|
| 1/2 | 0.840 ± 0.004 | 0.848 | 0.832 | 0.147 | 0.502 |
| 3/4 | 1.050 ± 0.004 | 1.060 | 1.040 | 0.154 | 0.698 |
| 1 | 1.315 ± 0.005 | 1.325 | 1.305 | 0.178 | 0.910 |
| 1¼ | 1.660 ± 0.005 | 1.672 | 1.648 | 0.191 | 1.227 |
| 1½ | 1.900 ± 0.008 | 1.912 | 1.898 | 0.200 | 1.446 |
| 2 | 2.375 ± 0.006 | 2.387 | 2.363 | 0.218 | 1.881 |
| 2½ | 2.875 ± 0.007 | 2.890 | 2.860 | 0.276 | 2.250 |
| 3 | 3.500 ± 0.008 | 3.515 | 3.485 | 0.300 | 2.820 |
| 3½ | 4.000 ± 0.008 | 4.050 | 3.950 | 0.318 | 3.280 |
| 4 | 4.500 ± 0.009 | 4.550 | 4.450 | 0.337 | 3.737 |
| 5 | 5.583 ± 0.010 | 5.613 | 5.513 | 0.375 | 4.713 |
| 6 | 6.500 ± 0.011 | 6.675 | 6.575 | 0.432 | 5.646 |
| 8 | 8.625 ± 0.010 | 8.675 | 8.575 | 0.500 | 7.455 |

Standard outside diameters of tubing are shown in the trade size columns. Further, the above-tables show the actual average outside diameters along with their respective tolerances, maximum outside diameters, minimum outside diameters, minimum wall thicknesses, and minimum inside diameters for typical tubing manufactured according to Schedules 40 and 80. These tables are merely a sample of dimensions for Schedule 40 and Schedule 80 PVC tubing, and these tables are not intended to limit the scope of the present invention unless it is stated otherwise.

After the threads 13 are formed on the Schedule 80 tubing 12, the wall thickness of the tubing 12 becomes thinner in the roots (valleys) formed between the crests (ridges) of the threads 13 so that the minimum wall thickness of the tubing 12 is at least equivalent to the wall thickness of Schedule 40 PVC tubing for a given trade size. In a preferred form, the minimum wall thickness of the threaded tubing 12 is greater than the wall thickness of Schedule 40 PVC tubing for a given trade size so that the tubing 12 has greater rigidity. If an unthreaded length of Schedule 40 PVC tubing is threaded using a threading machine, the threaded Schedule 40 tubing will have an unacceptable minimum wall thickness, and the threaded Schedule 40 tubing will not provide enough rigidity to meet most local codes. Any type of PVC tubing having dimensions below Schedule 40, such as "Schedule A", does not provide enough rigidity so that the electrical service boxes can be safely connected together. Therefore, most local codes set schedule 40 PVC tubing as the minimum type of tubing allowed for electrical wire conduits between electrical service boxes. Since both the Schedule 40 and 80 standards are widely accepted and provide adequate rigidity, most local electrical codes already certify both Schedule 40 and 80 PVC tubing as acceptable for electrical service box conduits. Since the conduit 10 of the present invention has minimum wall thickness that is at least equivalent to Schedule 40 tubing, the conduit 10 of the present invention may not have to go through a difficult and lengthy certification process for each locality.

The term "continuously-threaded Schedule 80 PVC tubing" includes Schedule 80 PVC tubing which is continuously-threaded on a threading machine to have a minimum wall thickness at least equivalent to Schedule 40 PVC tubing at a given trade size. The term "continuously-threaded Schedule 80 PVC tubing" further includes tubing which is molded or extruded to have threads continuously formed therein and which has a minimum wall thickness at least equivalent to Schedule 40 PVC tubing at a given trade size. Furthermore, the term "continuously-threaded Schedule 80 PVC tubing" includes continuously-threaded tubing formed in other manners generally known to those skilled in the art which has a minimum wall thickness which is at least equivalent to Schedule 40 PVC tubing at a given trade size.

Figure 3:
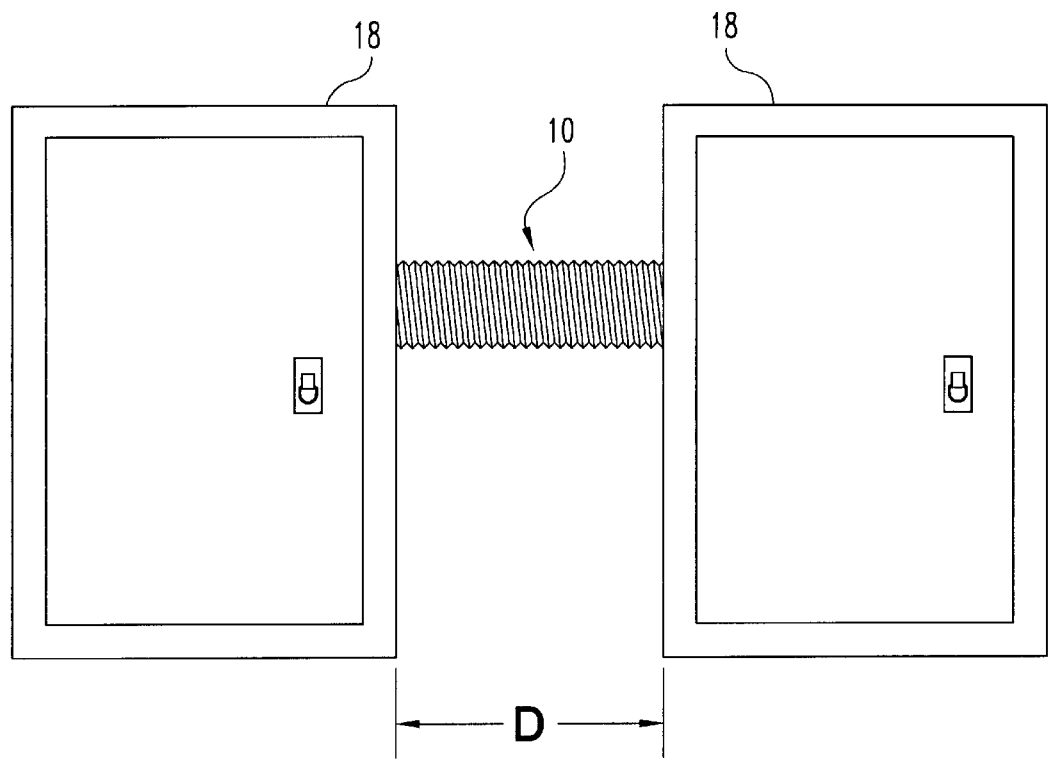
FIG. 3 shows a view of the conduit provided between two electrical service boxes.

Referring now to FIG. 3, a view of the conduit 10 extending between two electrical service boxes 18 is shown. The conduit 10 holds electrical wires which run between both boxes 18. The electrical service boxes 18 can be any type of electrical enclosure including circuit breaker boxes, electrical meter boxes, electrical control cabinets, and other electrical enclosures generally known to those skilled in the art.

During installation of the conduit 10, the tubing 12 is cut to a length which is slightly greater than distance D between the electrical service boxes 18 so that the lock nuts 14 and bushings 16 can be threaded onto the ends inside the box. Preferably for residential projects the tubing 12 has trade size between a half-inch (0.5") to two-and-a-half inches (2.5"). In a preferred form, the tubing 12 has a trade size of two-inches (2"). However, tubing 12 with other sizes are also contemplated to be part of the present invention. In industrial applications, for example, tubing 12 with trade sizes between five-inches (5") to six-inches (6") could also be used. The tubing 12 in a preferred form has an initial length of three feet (3'). However, the present invention also contemplates that the tubing 12 can have any initial length depending on the requirements of a project. In a preferred form, the tubing 12 is straight so that it can be easily manufactured and installed. The tubing 12 of the conduit 10 may also have a bent or curved shape in order to avoid obstacles and to extend between offset electrical service boxes 18.

Figure 4:
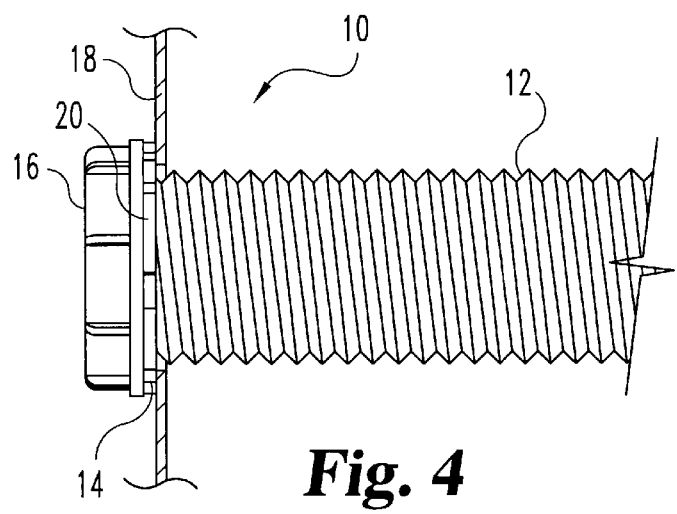
FIG. 4 shows a partial cross-sectional view of one end of the conduit coupled to one of the electrical service boxes.

Both ends of conduit 10 are coupled to respective boxes 18. FIG. 4 shows one preferred form of coupling the conduit 10 to one of the boxes 18. The other of the boxes 18 can be coupled to the conduit 10 in a similar manner. The tubing 12 is cut to a length which is slightly greater than the distance D between the service electrical boxes 18 so that each end can extend inside the electrical service boxes 18. This allows the lock nut 14 and bushing 16 to be cooperatively threaded onto the tubing 12 so that the tubing 12 is secured to the electrical service box 18. No material is wasted because excess tubing can be recycled for other projects. As shown in FIG. 4, the box has a hole 20 through which the tubing 12 extends inside the box 18. The hole 20 can be located on any surface of the box 18. Both the lock nut 14 and bushing 16 are threaded onto the tubing 12 in order to secure the tubing 12 to the electrical service box 18. The lock nut 14 secures the bushing 16 to prevent the bushing 16 from loosening. In an alternate form, only the bushing 16 is threaded onto the tubing 12 in order to secure the electrical service box 18. The other end of tubing 12 can be secured in a similar manner. It is also contemplated that other types of threaded fittings generally known to those skilled in the art can be used to secure the tubing 12 to the electrical service boxes 18. Further, it is contemplated that the lock nut 14 and bushing 16 can also threaded in other manners which are generally known to those skilled in the art in order to secure the tubing 12.

Figure 5:
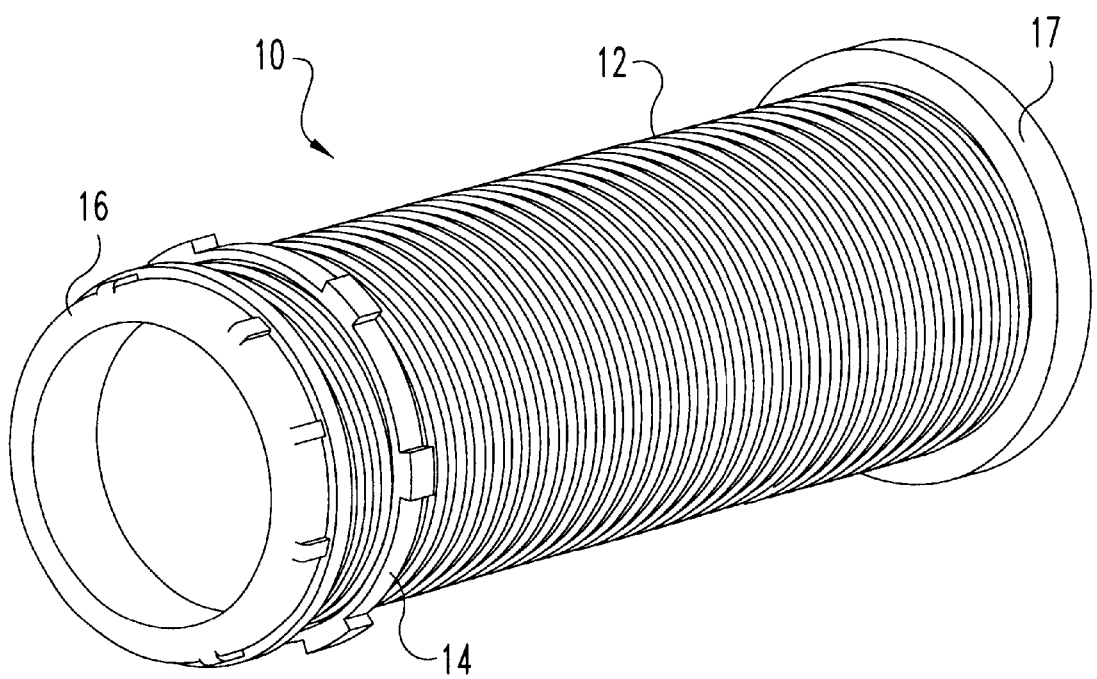
FIG. 5 shows a perspective view of a conduit according to an additional embodiment of the present invention.
Figure 6:
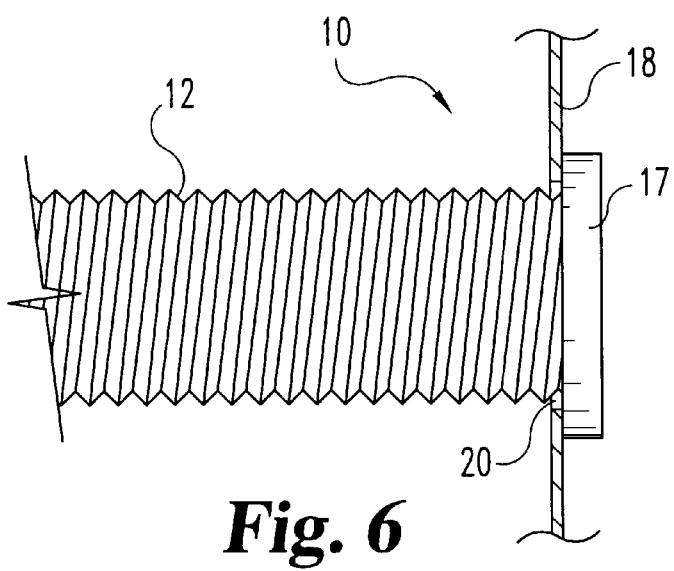
FIG. 6 shows a partial cross-sectional view of one end of the conduit according to the additional embodiment coupled to one of the electrical service boxes.

Referring now to FIGS. 5–6, another preferred embodiment of the present invention is shown. In this embodiment, the tubing 12 has a fixed collar 17 provided on one end. Preferably fixed collar 17 is molded on one end of the tubing 12 when the tubing 12 is formed. The tubing 12 can have any length, and the tubing 12 is continuously threaded so that the tubing 12 can be cut to any required size (as discussed above). In a preferred form, the tubing 12 has a length between one to two-and-a-half inches (1"–2.5").

Fixed collar 17 reduces the amount of labor and material needed to secure the conduit 10 to electrical service boxes 18. FIG. 6 shows how fixed collar 17 secures one end of the conduit 10 to one of the electrical service boxes. The tubing 12 is inserted through the hole 20 in one of the electrical service boxes 18. The tubing 12 is fed through the hole 20 until fixed collar 17 abuts the wall of the electrical service box 18 surrounding the hole 20. The other end of the tubing 12 is secured to the other electrical service box 18 in a manner which is shown in FIG. 4. The conduit 10 according to this embodiment is easier to install because fittings only have to be threaded on one end. In typical tubing, positioning of the tubing can be difficult during installation because the ends of the tubing tend to slip out of the holes in the electrical service boxes. Fixed collar 17 prevents this slippage of the end of tubing 12 through the hole 20. This makes installation of the conduit 10 through building walls easier. Further, the tubing 12 can be cut more accurately since only the width of one bushing 16 and one lock nut 14 needs to be considered when determining the required length of tubing.

While a specific embodiment of the invention has been shown and described in detail, the breadth and scope of the present invention should not be limited by the above described exemplary embodiment, but should be defined only in accordance with the following claims and their equivalents.

What is claimed:

1. A conduit for electrical wires, comprising:
   a length of continuously-threaded Schedule 80 PVC tubing having a minimum wall thickness at least equivalent to a minimum wall thickness of Schedule 40 tube for a given trade size, said tubing having a first end and a second end, said tubing being externally threaded from said first end to said second end;
   a first collar at the first end of said tubing, wherein said first collar is effective to retain the end of the tubing in an electrical service box; and
   a second collar threaded onto said second end of said tubing.
2. claim 1 wherein said first collar is a threaded collar.
3. claim 2 and further including a lock nut cooperatively threaded with said first threaded collar.
4. The conduit of claim 1, wherein said first collar is a fixed collar.
5. An apparatus, comprising:
   a first electrical service box;
   a second electrical service box; and
   a conduit for containing electrical wires extending between said first electrical service box to said second electrical service box, said conduit comprising:
   a length of continuously-threaded Schedule 80 PVC tubing having a minimum wall thickness at least equivalent to a minimum wall thickness of Schedule 40 tube for a given trade size, said tubing having a first end and a second end, said tubing being externally threaded from said first end to said second end; and
   a threaded bushing cooperatively threaded onto said conduit to secure said conduit to said first electrical service box.
6. The apparatus of claim 5, further comprising:
   a lock nut cooperatively threaded onto said conduit to secure said conduit to said first electrical service box.
7. The apparatus of claim 6, further comprising:
   a second lock nut and a second threaded bushing cooperatively threaded onto said conduit to secure said conduit to said second electrical service box.
8. The apparatus of claim 5, wherein said tubing has a collar to secure said conduit to said second electrical service box.
9. The conduit of claim 8, wherein said collar is a fixed collar.
10. A method of providing a conduit for electrical wires between two electrical service boxes, said method comprising:
    providing a length of continuously-threaded Schedule 80 PVC tubing having a minimum wall thickness at least equivalent to a minimum wall thickness of Schedule 40 tube for a given trade size, the tubing having a length that is greater than a distance between the two electrical service boxes;
    cutting the tubing to a length which is slightly greater than the distance between the two electrical service boxes such that the tubing has a first end and a second end;
    coupling the first end of the tubing to one of the electrical service boxes by positioning the first end of the tubing inside the one electrical service box and threading a threaded bushing onto the first end of the tubing to secure the tubing to the one electrical service box; and
    coupling the second end of the tubing to the other of the electrical service boxes.
11. The method of claim 10, wherein said coupling of the first end of the tubing includes threading a lock nut onto the first end of the tubing.
12. The method of claim 11, wherein said coupling of the second end of the tubing includes positioning the second end of the tubing inside the other electrical service box, and threading a second lock nut and a second threaded bushing onto the second end of the tubing to secure the tubing to the other of the electrical service boxes.
13. The method of claim 10, wherein said coupling of the second end of the tubing includes inserting the first end of the tubing through a hole in the other of the electrical service boxes until a collar provided on the second end of the tubing abuts an area of the other of the electrical service boxes which surrounds the hole.

* * * * *

UNITED STATES PATENT AND TRADEMARK OFFICE
CERTIFICATE OF CORRECTION

PATENT NO.   : 6,410,852 B1
DATED        : June 25, 2002
INVENTOR(S)  : Ronald E. Schimpf It is certified that error appears in the above-identified patent and that said Letters Patent is hereby corrected as shown below:

<u>Column 5,</u>
Line 20, which is line 12 of the Table herein, replace the entire line and substitute:
-- 6   6.625±0.011   6.675   6.575   0.432   5.646 --

Signed and Sealed this

Fourth Day of February, 2003

JAMES E. ROGAN
*Director of the United States Patent and Trademark Office*